United States Patent [19]

Hauschildt et al.

[11] Patent Number: 5,618,858

[45] Date of Patent: Apr. 8, 1997

[54] POLYMER MATERIAL

[75] Inventors: Hans-Georg Hauschildt; Wilfried Haas, both of Erlangen; Heinz Hacker, Nürnberg, all of Germany

[73] Assignee: Siemens Aktiengesellschaft, München, Germany

[21] Appl. No.: 571,945

[22] PCT Filed: Jun. 22, 1994

[86] PCT No.: PCT/DE94/00711

§ 371 Date: Jan. 5, 1996

§ 102(e) Date: Jan. 5, 1996

[87] PCT Pub. No.: WO95/02013

PCT Pub. Date: Jan. 19, 1995

[30] Foreign Application Priority Data

Jul. 5, 1993 [DE] Germany ............ 43 22 351.6

[51] Int. Cl.$^6$ ...................................... C08K 9/00
[52] U.S. Cl. ................. 523/200; 523/205; 523/206; 523/208; 523/210; 524/13; 524/14; 524/31; 524/32; 524/33; 524/35
[58] Field of Search ............... 428/264, 278; 523/200, 205, 206, 208, 210; 524/13, 14, 31, 32, 33, 35

[56] References Cited

U.S. PATENT DOCUMENTS 3,755,220  8/1973  Freimark et al. ............ 260/17.3
3,943,079  3/1976  Hamed ...................... 260/17.4 BB

OTHER PUBLICATIONS

Saechtling, H., "Kunststoff Taschenbuch," 24.Ausgabe, Carl Hanser Verlag, München 1989, pp. 452–453.

*Primary Examiner*—Edward J. Cain
*Attorney, Agent, or Firm*—Kenyon & Kenyon

[57] ABSTRACT

A polymer material for manufacturing arcing chambers for low-voltage switchgear is characterized by a thermoplastic polymer matrix of polyamide or polyolefin which contains a cellulose material sheathed by cured melamine-formaldehyde resin.

10 Claims, No Drawings

POLYMER MATERIAL

BACKGROUND OF THE INVENTION

The invention relates to a polymer material for manufacturing arcing chambers for low-voltage switchgear, as well as to a method for manufacturing the same.

In low-voltage switchgear, such as low-voltage power circuit-breakers, the switch-off arc is supposed to migrate from the point of origin, i.e., from the separating contacts, quickly into the quenching device, i.e., into the arc splitter plates. The properties of the material of the arc-quenching or arcing chamber have a considerable effect on this arcing movement, particularly in the case of short-circuit breaking. It happens, namely, during arcing movement that gaseous products are released from the chamber material because of the briefly occurring high arc temperature. These gases are needed to quickly extinguish the arc if they have the necessary chemical composition and when they are formed—per switching operation—in a quantity that is suited for avoiding too high a pressure inside the switch.

Under the state of the art, one has generally used molded materials based on cellulose-fiber-filled melamine-formaldehyde resins to fabricate arcing chambers (see, e.g.: Hansjürgen Saechtling "Kunststoff-Taschenbuch" [Plastics Manual], 24th edition, Carl Hanser Publishers, Munich 1989, p. 452). However, these are thermosetting materials, and—due to the long mold occupation time and the required postcure—it is, therefore, complicated and expensive to manufacture the chambers, even though this is done analogously to injection molding.

The object of the invention is to specify a polymer material that will make it possible to substantially shorten the cycle times required in the manufacturing of arcing chambers for low-voltage switchgear.

SUMMARY OF THE INVENTION

This is achieved in accordance with the invention by a material having a thermoplastic polymer matrix of polyamide or polyolefin which contains a cellulose material sheathed by cured melamine-formaldehyde resin.

DETAILED DESCRIPTION OF THE INVENTION

The polymer material according to the invention is a thermoplastic material, i.e., a thermoplastic compound. The advantages of this compound—in comparison to thermosetting compounds—lie in an improved processibility. While, namely, a 75 s cycle must be observed when working with the injection molding of thermosetting material, cycle times as low as 3 s can be attained with the thermoplastic compound according to the invention. It is thus possible, then, to have a substantially more economical manufacturing. Moreover, from an electrical standpoint, the thermoplastic material is at least equal to the thermosetting material; the mechanical properties are even better—due to a greater flexibility.

The chamber material produced from the thermoplastic compound exhibits better arc quenching properties than the material used in known methods heretofore. It is also superior with regard to the switching capacity, since the compressive load is substantially lower (reduction in the maximum pressure by up to 50%).

In the case of the thermoplastic compound according to the invention., the polymer matrix consists of polyamide or polyolefin; preference is given to polyamide. For cellulose material, which is advantageously used in the form of fibers, one can use in particular, pure cellulose, wood dust, paper or rayon staple fiber; cellulose is preferred in this case.

The individual components of the thermoplastic compound are preferably available in the following ratio: polymer, i.e., polyamide or polyolefin, to melamine-formaldehyde resin/cellulose material: 6:1 to 1:1, preferably 2:1; melamine-formaldehyde resin to cellulose material: 3:2 to 1:2, preferably 1:1.

The polymer material is produced in accordance with the invention in that cellulose material sheathed by melamine-formaldehyde resin and polymer are mixed together homogeneously at temperatures above 150° C. The temperature is dependent in this case upon the processing temperature of the polymer used. When working with polyamide, it can lie between about 190° and 300° C.; when working with polyolefin it amounts, for example, to 150° C. (polyethylene) or 200° C. (polypropylene).

In developing the polymer material according to the invention, the problem arose of being able to work in temperature-sensitive materials into the thermoplastic material non-destructively. Namely, it is not possible per se to use cellulose in high-melting thermoplastic systems, temperatures of >150° C. being necessary during intermingling and processing, because of the thermal-oxidative sensitivity of the cellulose.

Now, the invention resolves this problem by sheathing the cellulose material in situ with a protective layer, which—given a higher thermal stress of short duration—prevents oxidation or decomposition. This makes it easily possible to work the cellulose into higher melting thermoplastic materials, such as polyamide.

In manufacturing the polymer material according to the invention, one starts out preferably from uncross-linked melamine-formaldehyde resin; generally, one uses a commercially available, pre-reacted melamine-formaldehyde resin (in short melamine resin) that is filled with cellulose. During the intermingling or mixing operation, the melamine resin molding material is cured in the liquefied polymer material, i.e., a cross-linking takes place which, in this manner, protects the cellulose material from a thermal-oxidative attack. The cellulose-filled melamine resin molded material formed in this case, which is distributed homogeneously ill the polymer matrix, assumes the function of a filler at the same time; this is synonymous with a mechanical reinforcement.

Another important advantage of the invention consists in that there is the possibility of recycling. This applies both for the waste material produced as sprues, for example, when arcing chambers are manufactured using injection molding, as well as for the thermoplastic compound that is injection-molded to form molded articles. Used molded articles can be comminuted, namely, and the material obtained can be used—directly or mixed with fresh material—to injection-mold new arcing chambers. In comparison, the thermosetting material used under the state of the art, itself, cannot undergo a recycling operation, because it is three-dimensionally cross-linked.

The invention will be elucidated in the following on the basis of exemplary embodiments.

EXAMPLE 1

PA 6 (polyamide from ε-caprolactam) is mixed in a ratio of 2:1 witch an uncross-linked melamine resin (MF), which is filled with cellulose in a ratio of 1:1. This mixture is introduced at a temperature of 230° to 240° C. into a masticator and masticated for about 10 min. The processing temperature of the PA 6 of about 240° C. causes the uncross-linked thermosetting material, i.e., the MF/cellulose compound to become cross-linked, and the cellulose is sheathed at the same time.

The thermoplastic compound produced in this manner—composition: 66.6% polyamide, 16.7% melamine-formaldehyde resin, 16.7% cellulose—has good arc quenching properties and can be injection-molded perfectly well (cycle time: about 25 s). The cellulose acts in this case both as a water reservoir for the arc quenching, as well as—together With the cross-linked melamine resin—as a filler for reinforcing the polyamide.

EXAMPLE 2

One proceeds comparably to Example 1, but an oppositely rotating two-wave extruder is used. The period of dwell (reaction time) amounts in this case merely to 5 to 6 min., so that a continuous process is possible. The thermoplastic compound obtained is completely cured.

EXAMPLE 3

One proceeds comparably to Example 1, PA 66 (polyamide from 1.6 hexandiamine and adipic acid) being used as a polymer; the processing temperature amounts to about 275° C. The thermoplastic compound demonstrates a high level of long-term heat resistance.

EXAMPLE 4

In a two-wave extruder, PA 66 is melted down directly downstream from the filling zone in counterrotation at a temperature of 275° to 280° C. Immediately after that—in a ratio of 2:1 —a MF/cellulose compound is introduced by means of a dosing device into the liquefied polyamide material. The melamine resin that is immediately cross-linked at the high temperature of about 280° C. thereby sheathes the cellulose and protects it from thermal decomposition. During a speed-dependent period of dwell of 4 to 8 min, one achieves an adequate cross-linkage of the melamine resin and a homogeneous distribution in the polymer matrix. The liquefied material emerging from the nozzle tip of the extruder is drawn off as a strand, cooled and granulated. The thermoplastic compound produced in this manner is homogeneous and can be injection-molded to form perfect molded articles at temperatures of 275° to 280° C.

EXAMPLE 5

To process thermosetting waste material on the basis of melamine resin, which is filled with the most widely varying cellulose-containing materials, PA 6 or PA 66 or also another polyamide, such as PA 12 (from ε-lauric lactam) or PA 610 (from 1.6-hexanediamine and sebacic acid), are melted down in a two-wave extruder, which is operated in synchronism or in counterrotation, and mixed by means of a dosing device with the ground waste material in a ratio of 6:1 to 1:1; the particle size of the pulverulent waste material should be <0.1 mm. The thermoplastic compound obtained is granulated and dried using a procedure comparable to Example 4, and can then be directly injection-molded to form arcing chambers.

One can proceed in a corresponding manner With cellulose-containing urea-formaldehyde resins, which are then worked into polyolefin.

What is claimed is:

1. A polymeric material for manufacturing arcing chambers for low-voltage switching devices, comprising a thermoplastic polymer matrix of polyamide or polyolefin which contains a cellulose material sheathed by cured melamine-formaldehyde resin, wherein the polymer and melamine-formaldehyde resin/cellulose material are present in a ratio of 6:1 to 1:1.

2. The polymeric material according to claim 1, wherein said ratio is 2:1.

3. The polymeric material according to claim 1, wherein the ratio of melamine-formaldehyde resin to cellulose material is from 3:2 to 1:2.

4. The polymeric material according to claim 2, wherein the ratio of melamine-formaldehyde resin to cellulose material is from 3:2 to 1:2.

5. The polymeric material according to claim 1, wherein the cellulose material is present in a fiber form.

6. The polymeric material according to claim 2, wherein the cellulose material is present in a fiber form.

7. The polymeric material according to claim 3, wherein the cellulose material is present in a fiber form.

8. The polymeric material according to claim 4, wherein the cellulose material is present in a fiber form.

9. A method for manufacturing the polymeric material of claim 1, comprising the step of homogeneously mixing cellulose material sheathed by melamine-formaldehyde resin together with polyamide or polyolefin at a temperature above 150° C.

10. The method according to claim 9, wherein the melamine-formaldehyde resin is not crosslinked.

* * * * *